United States Patent
Dally

(10) Patent No.: US 11,569,780 B2
(45) Date of Patent: Jan. 31, 2023

(54) PURLIN SYSTEM FOR SOLAR MODULE ATTACHMENT

(71) Applicant: SUN AND STEEL SOLAR LLC, Stateline, NV (US)

(72) Inventor: Robert B. Dally, Stateline, NV (US)

(73) Assignee: SUN AND STEEL SOLAR LLC, Stateline, NV (US)

( * ) Notice: Subject to any disclaimer, the term of this patent is extended or adjusted under 35 U.S.C. 154(b) by 0 days.

(21) Appl. No.: 17/203,400

(22) Filed: Mar. 16, 2021

(65) Prior Publication Data
US 2021/0297037 A1 Sep. 23, 2021

Related U.S. Application Data

(60) Provisional application No. 62/990,900, filed on Mar. 17, 2020.

(51) Int. Cl.
*H02S 20/32* (2014.01)
*F16M 11/10* (2006.01)

(52) U.S. Cl.
CPC .............. *H02S 20/32* (2014.12); *F16M 11/10* (2013.01)

(58) Field of Classification Search
CPC ...... F24S 30/425; F24S 2030/15; F24S 25/65; F24S 25/12; F24S 25/634; F24S 25/636; Y02E 10/47; Y02E 10/50; F16B 9/023; F16M 11/10; F16M 11/18; H02S 20/32
See application file for complete search history.

(56) References Cited

U.S. PATENT DOCUMENTS

| | | | | |
|---|---|---|---|---|
| 8,939,648 B2 * | 1/2015 | Schneider | .............. | F24S 25/70 384/444 |
| 9,035,168 B2 * | 5/2015 | Barton | .................. | F24S 30/425 136/246 |
| 9,134,045 B2 * | 9/2015 | Ashmore | ................ | F24S 25/12 |
| 9,206,999 B2 * | 12/2015 | Reed | ......................... | F24S 25/70 |
| 9,249,993 B2 * | 2/2016 | Kotagiri | ................. | G02B 7/183 |
| 9,276,521 B2 * | 3/2016 | Reed | ....................... | F24S 25/65 |
| 9,281,778 B2 * | 3/2016 | Corio | .................... | F24S 30/425 |
| 9,322,437 B2 * | 4/2016 | Agullo | ..................... | F16C 23/04 |
| 9,482,449 B2 * | 11/2016 | Cole | ......................... | H02S 30/10 |
| 9,551,508 B2 * | 1/2017 | Straeter | .................... | F24S 25/70 |
| 9,793,852 B2 * | 10/2017 | Almy | ....................... | H02G 3/32 |
| 9,819,301 B2 * | 11/2017 | Ripoll Agullo | ....... | F24S 30/425 |
| 9,845,824 B2 * | 12/2017 | Lamb | .................... | F16C 33/201 |

(Continued)

FOREIGN PATENT DOCUMENTS

WO WO-2021185894 A2 * 9/2021 ............ H02S 20/32

*Primary Examiner* — Patrick D Hawn
(74) *Attorney, Agent, or Firm* — Sherman IP LLP; Kenneth L. Sherman; Steven Laut

(57) ABSTRACT

One embodiment includes a device for solar tracker systems. The device includes a first purlin including a first mating surface configured for frictional attachment to a first side of a torque tube. The first purlin further including a first linear shaped top surface configured for mounting a first solar module. A second purlin includes a second mating surface configured for frictional attachment to a second side of the torque tube. The second purlin further including a second linear shaped top surface configured for mounting a second solar module. The first purlin and the second purlin connect to one another with a fastening clamp that is configured for holding the first purlin and the second purlin against the torque tube.

13 Claims, 18 Drawing Sheets

(56) References Cited

U.S. PATENT DOCUMENTS

| | | | | |
|---|---|---|---|---|
| 10,069,455 | B2* | 9/2018 | Corio | F24S 25/634 |
| 10,298,172 | B2* | 5/2019 | Oh | F24S 25/632 |
| 10,536,109 | B2* | 1/2020 | Corio | H02S 20/32 |
| 10,605,489 | B2* | 3/2020 | Worden | F24S 30/425 |
| 10,622,937 | B2* | 4/2020 | Pesce | H02S 20/30 |
| 10,720,877 | B2* | 7/2020 | Haas | F24S 25/65 |
| 10,771,007 | B2* | 9/2020 | Corio | F16F 1/3821 |
| 10,797,635 | B2* | 10/2020 | Watson | H02S 30/10 |
| 10,804,837 | B2* | 10/2020 | Wares | H02S 20/32 |
| 10,845,092 | B2* | 11/2020 | Dally | F24S 25/65 |
| 10,944,354 | B2* | 3/2021 | Ballentine | H02S 30/10 |
| 11,230,866 | B2* | 1/2022 | Dally | E05D 5/06 |
| 2010/0208375 | A1* | 8/2010 | Albisu Tristan | F24S 30/42 |
| | | | | 29/525.01 |
| 2011/0253195 | A1* | 10/2011 | Kim | H02S 20/32 |
| | | | | 136/246 |
| 2013/0153007 | A1* | 6/2013 | Plesniak | F24S 30/40 |
| | | | | 136/251 |
| 2014/0117190 | A1* | 5/2014 | Werner | E04C 3/08 |
| | | | | 248/346.03 |
| 2015/0234031 | A1* | 8/2015 | Corio | F24S 40/00 |
| | | | | 250/203.4 |
| 2016/0190976 | A1* | 6/2016 | Corio | F24S 25/634 |
| | | | | 248/214 |
| 2016/0218663 | A1* | 7/2016 | Werner | F24S 30/425 |
| 2017/0359017 | A1* | 12/2017 | Corio | F16M 11/10 |
| 2019/0158017 | A1* | 5/2019 | Hu | H02S 20/32 |
| 2019/0341878 | A1* | 11/2019 | Watson | H02S 20/32 |
| 2021/0180832 | A1* | 6/2021 | Schuknecht | F16B 2/065 |
| 2021/0194418 | A1* | 6/2021 | Ballentine | F24S 30/42 |
| 2021/0218363 | A1* | 7/2021 | Maldonado Ferreira | |
| | | | | H02S 30/00 |
| 2021/0234501 | A1* | 7/2021 | Worden | F24S 25/12 |

* cited by examiner

1000

1000

1100

1110

1200

1210

1220

1230

1300

1310

PURLIN SYSTEM FOR SOLAR MODULE ATTACHMENT

CROSS-REFERENCE TO RELATED APPLICATIONS

The present application claims priority to U.S. Provisional Patent Application No. 62/990,900, filed on Mar. 17, 2020, hereby incorporated by reference in its entirety.

TECHNICAL FIELD

The embodiments relate to an apparatus that comprises a purlin, or rail, for mounting solar modules to a rotating torque tube on a single-axis tracker.

BACKGROUND

Single-axis trackers are mounting structures used for the controlled movement of photovoltaic solar panels from east to west to track the sun daily. All single-axis trackers place the solar collectors on top of the moving mechanical structure, so that the moving mechanical structure will not shade the photovoltaic (PV) solar modules. Single-axis trackers that utilize a center torque tube as an axle, generally place the solar modules on top of straight purlins, of which are generally attached to the top of the torque tube, which makes the system top heavy.

Purlins have been placed on the bottom of torque tubes to lower the center of gravity, but they are bottom heavy and not balanced. Furthermore, the solar modules are shaded by the higher torque tube in this configuration. This configuration of mounting is also not common practice.

Purlins have been placed on the sides of torque tubes, but the torque tubes had factory attached tabs (usually welded steel tabs on a round steel torque tube) to which the purlins were anchored. This method of specialty fabrication increases the cost of the torque tubes.

The most common method employed is to have facets on the torque tube. A straight purlin can be placed on a flat side of a square torque tube, which generally is the top side and provides holding strength to the torque tube, but raises the center of gravity significantly.

Some single-axis tracker designs bend the torque tube, lowering the center of gravity, but requiring a torque tube system that is more like a crank shaft than a straight axle.

SUMMARY OF THE INVENTION

Some embodiments relate to a purlin, or rail, for mounting solar modules to a rotating torque tube on a single-axis tracker. One embodiment includes a device for solar tracker systems. The device includes a first purlin including a first mating surface configured for frictional attachment to a first side of a torque tube. The first purlin further including a first linear shaped top surface configured for mounting a first solar module. A second purlin includes a second mating surface configured for frictional attachment to a second side of the torque tube. The second purlin further including a second linear shaped top surface configured for mounting a second solar module. The first purlin and the second purlin connect to one another with a fastening clamp that is configured for holding the first purlin and the second purlin against the torque tube. One significant advantage of this purlin design is that it lowers the center of gravity of the solar modules relative to the center of the torque tube. Another significant advantage of this purlin design is that it can further lower the center of gravity by having downward sloping top surfaces from the torque tube attachment point outward. Still another significant advantage of this purlin system is that it can be easily disassembled and reworked if need be by simply removing the cinching strap.

These and other features, aspects, and advantages of the embodiments will become understood with reference to the following description, appended claims, and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The embodiments relate to an apparatus that comprises a purlin, or rail, for mounting solar modules to a rotating torque tube on a single-axis tracker. One or more embodiments include a specialized purlin that holds solar modules to a turning torque tube of a single-axis tracker. One embodiment includes a device for solar tracker systems. The device includes a first purlin including a first mating surface configured for frictional attachment to a first side of a torque tube. The first purlin further including a first linear shaped top surface configured for mounting a first solar module. A second purlin includes a second mating surface configured for frictional attachment to a second side of the torque tube. The second purlin further including a second linear shaped top surface configured for mounting a second solar module. The first purlin and the second purlin connect to one another with a fastening clamp that is configured for holding the first purlin and the second purlin against the torque tube.

One or more embodiments include the following advantages over conventional solar tracking systems. One advantage is that a purlin is provided that reliably attaches to the sides of a round (or cylindrical) shaped torque tube, and thus lowers the center of gravity of a solar tracking system. Another advantage of some embodiments is that a purlin is provided that lowers the center of gravity by sloping the top surface of the purlin downward, and thus also the solar modules are sloped downward. Yet another advantage is that a purlin provided matches the strength to the bending forces and thereby maximizes the strength-to-mass ratio, making an efficient use of material. Still another advantage is that a purlin is provided that has a large surface mating area for holding the purlin against a round torque tube.

Figure 1:
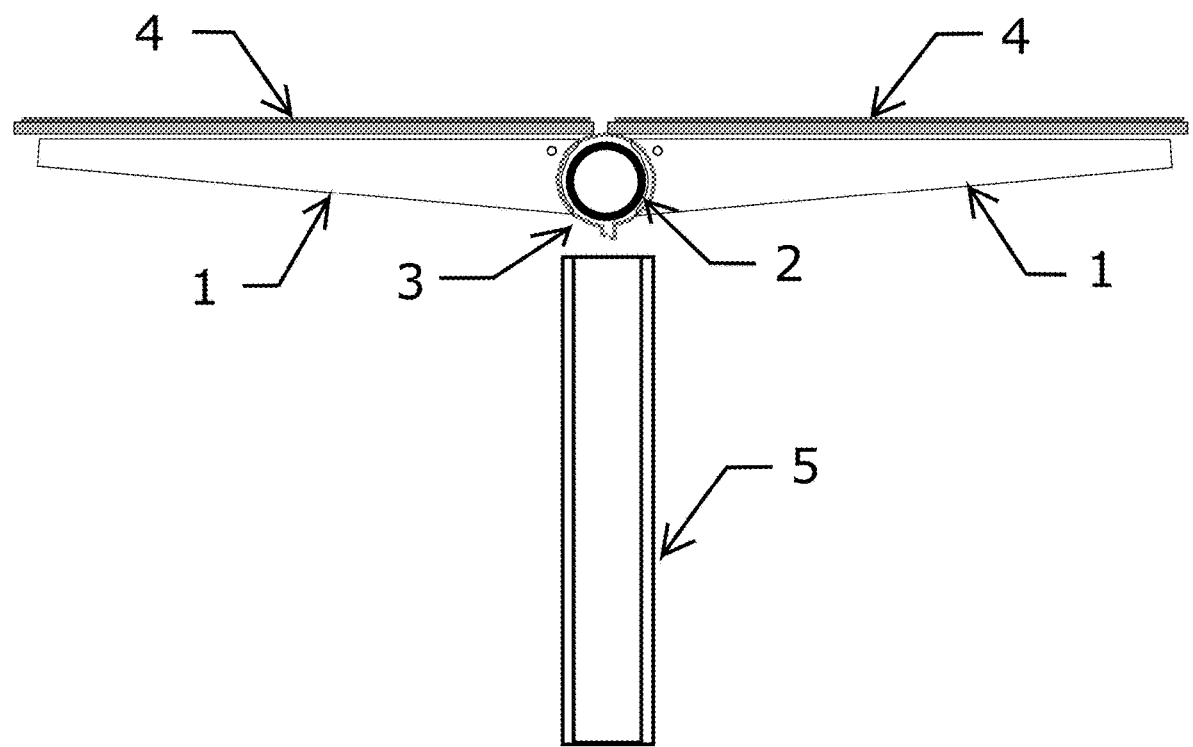
FIG. 1 shows solar modules on sloped purlins mounted to the sides of a round torque tube, according to one or more embodiments.

FIG. 1 shows solar modules (or panels) 4 attached or connected to a pair of sloped purlins 1 mounted to the sides of a round (or cylindrical shaped) torque tube 2, according to one or more embodiments. One feature is that the purlins 1 do not have a straight or rectangular shape are not sitting on top of the torque tube 2, but instead slopes or varies in height on the lower portion and attaches to the sides of the torque tube 2. In one embodiment, the purlin 1 may be cinched down against the torque tube 2 with a round strap. As shown, the side view of a single-axis tracker includes the purlins 1 cinched onto a torque tube 2 using a tightening strap (or clamp, bracket, etc.) 3. The solar modules 4 are attached to the purlins 1 and are close to each other over the torque tube 2, which rotates in any bearings (not shown) attached to the top of a series of posts 5 (mounted, implanted, etc.) to a surface, such as the ground, a platform, a rooftop, etc. The purlin 1 is sloped on the lower portion to minimize material use, to maximize contact arc and hence cinching strength, and to lower the center of gravity to achieve a balanced load of solar modules 4.

Figure 2:
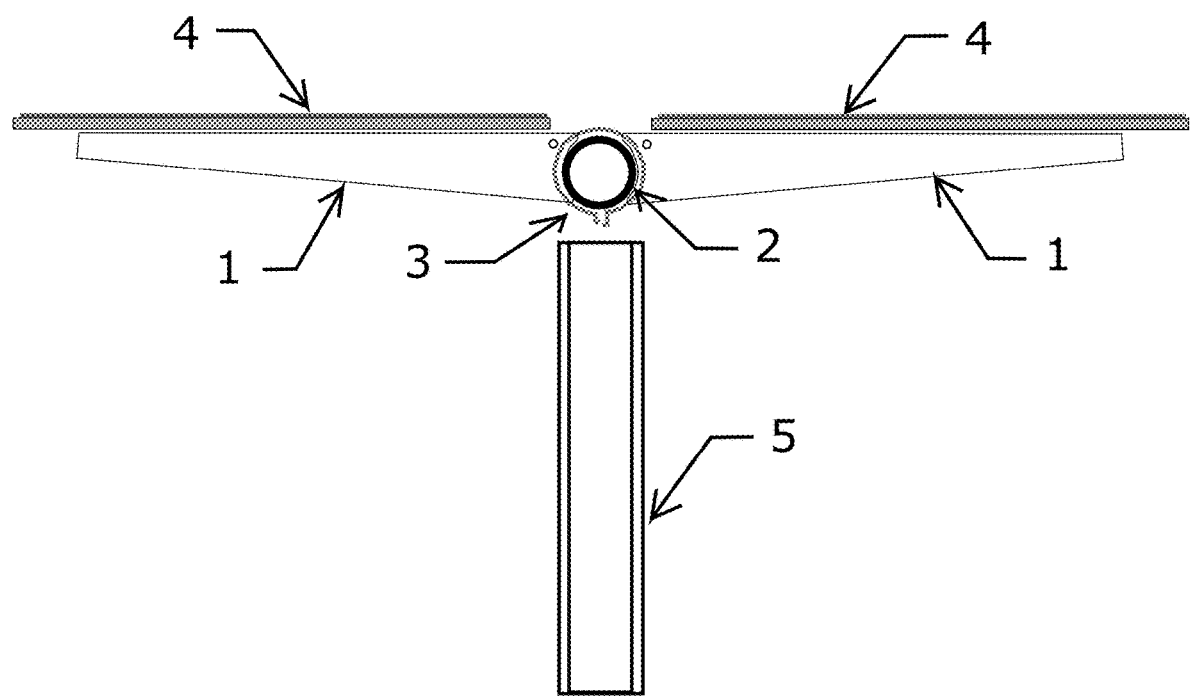
FIG. 2 shows solar modules with a center gap on sloped purlins mounted to a round torque tube, according to one or more embodiments.

FIG. 2 shows solar modules 4 with a center gap on sloped purlins 1 mounted to a round torque tube 2, according to one or more embodiments. Distinguishable from the system shown in FIG. 1, the solar modules component 4 are disposed outwards by a space or distance of about the length of the radius of the torque tube 2. In some embodiments, the solar modules 4 are bifacial, and able to collect light from both the frontside (or top) and backside (or bottom). Ground reflected light is collected on the backside active area of the solar modules 4. The ground reflected light also strikes the torque tube 2, which casts a shadow upwards, and thus bifacial solar modules 4 are moved outward to avoid the shadow. In some embodiments, the purlins 1 may be made of galvanized steel, aluminum, sheet metal, formed (heavy duty) polymer (e.g., plastics, etc.), etc. In one or more embodiments, the purlins 1 have a double-layer wall that rests against the round torque tube 2, yielding a frictional surface, and yielding an inside surface against which the tightening strap 3 cinches against. In some embodiments, the purlins 1 include access openings or holes at the top and the bottom for inserting the tightening strap 3 into the cavity or opening side of the purlins 1 and against the inside surface of the double wall. The tightening strap 3 can have its protruding tabs and tightening bolt tucked up inside the purlins 1 to hide the protrusion, and to remove a safety hazard.

Figure 3:
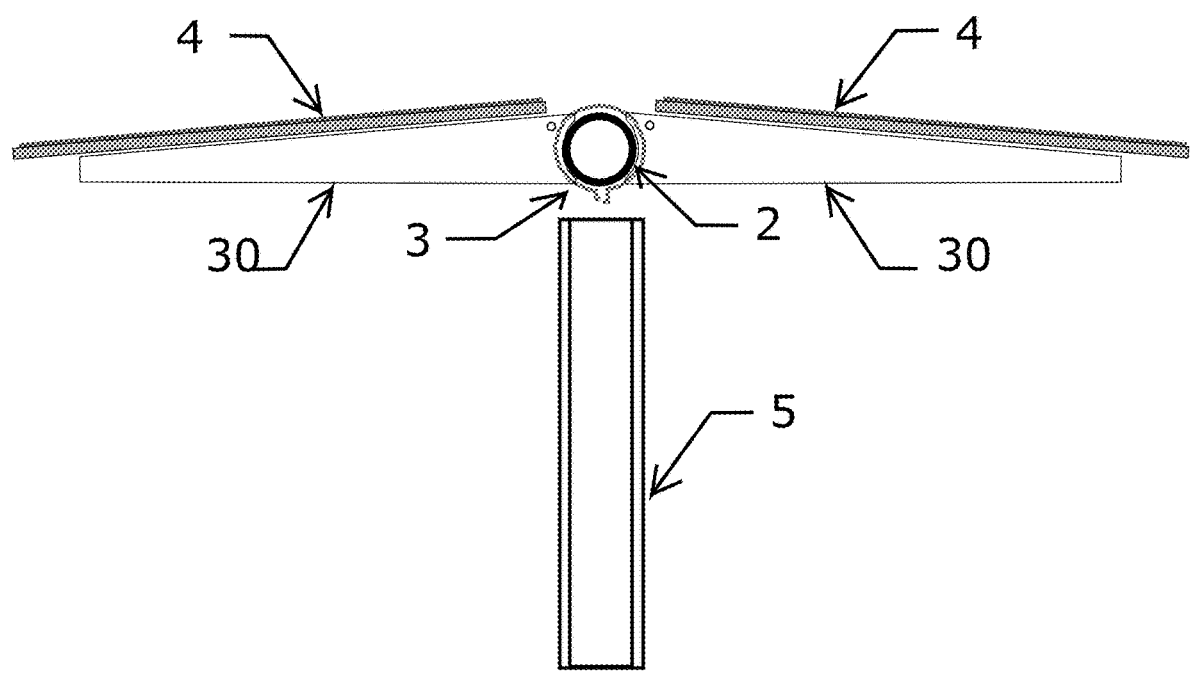
FIG. 3 shows solar modules with center gap on sloped purlins mounted to a round torque tube, according to one or more embodiments.

FIG. 3 shows solar modules 4 with center gap on sloped purlins 30 mounted to a round torque tube 2, according to one or more embodiments. The purlins 30 and mounted solar modules 4 are tilted downward to lower the center of gravity.

Figure 4:
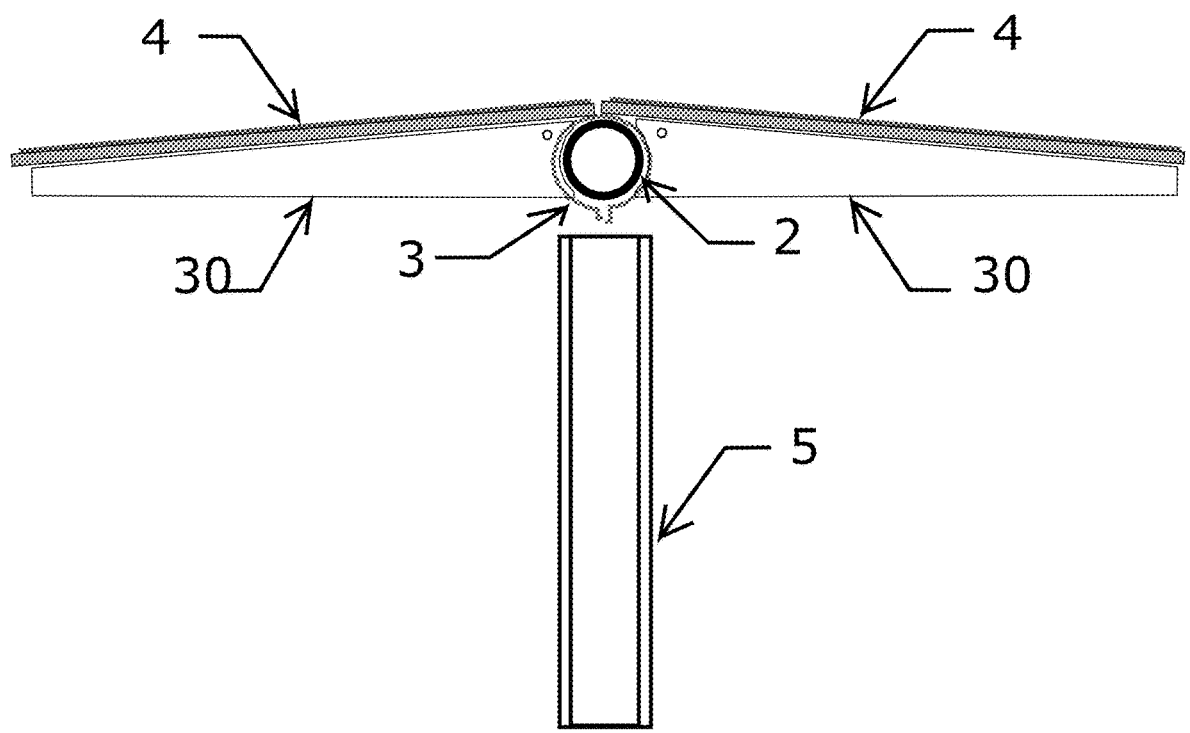
FIG. 4 shows solar modules on tilted and sloped purlins mounted to a round torque tube, according to one or more embodiments.

FIG. 4 shows solar modules 4 on tilted and sloped purlins 30 mounted to a round torque tube 2, according to one or more embodiments. In some embodiments, this system is similar to that shown in FIG. 3, but with the solar modules 4 connected to the purlins 30 without the spacing or gap between the solar modules 4. In some embodiments, the purlins 30 may be made of galvanized steel, aluminum, sheet metal, formed (heavy duty) plastic, etc. In one or more embodiments, the purlins 30 have a double-layer wall that rests against the round torque tube 2, yielding a frictional surface, and yielding an inside surface against which the tightening strap 3 cinches against. In some embodiments, the purlins 30 include access openings or holes at the top and the bottom for inserting the tightening strap 3 into the cavity or opening side of the purlins 30 and against the inside surface of the double wall. The tightening strap 3 can have its protruding tabs and tightening bolt tucked up inside the purlins 30 to hide the protrusion, and to remove a safety hazard.

Figure 5A:
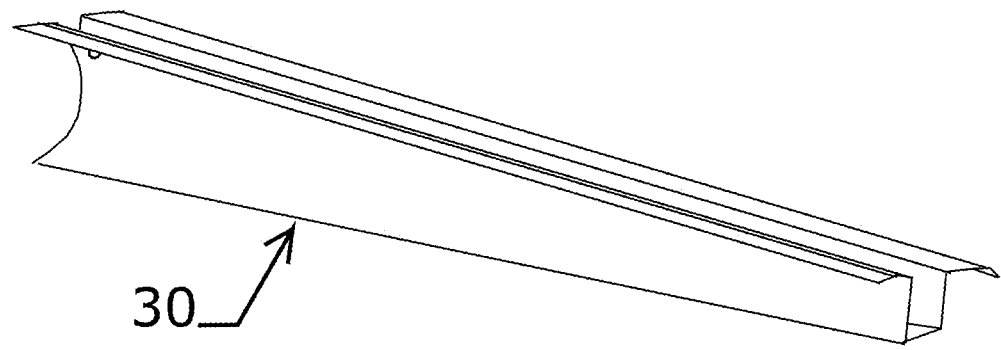
FIGS. 5A-B show different views of a sloped purlin, according to one or more embodiments.
Figure 5B:
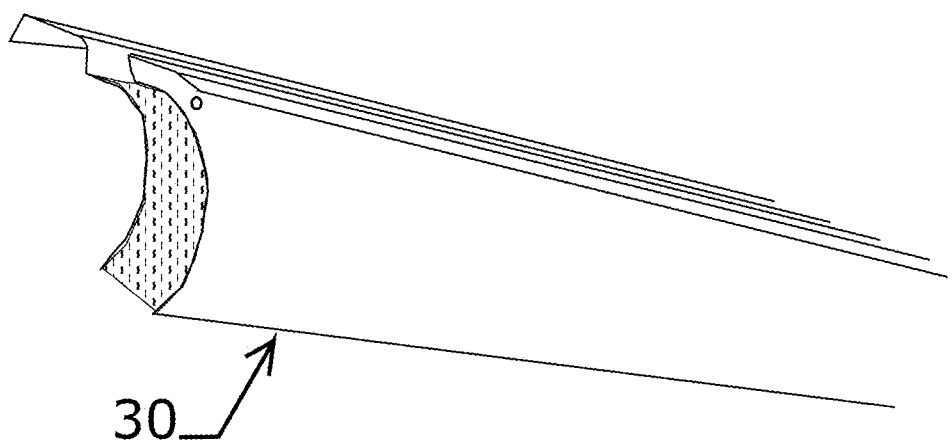

FIGS. 5A-B show different views of a sloped purlin 30, according to one or more embodiments. The purlin 30 shown is formed after cutting and bending/forming, for example, a piece of sheet metal. FIG. 5A shows a three-dimensional (3D) view with the shorter, outside square-cut end displayed to the right. FIG. 5B shows the same formed purlin 30 with the taller, semi-circular end that interfaces with the round torque tube 2 (FIGS. 1-4) shown on the left. The taller end forms a round wall surface that rests against the round torque tube 2. Some embodiments include a purlin 30 having a "U" shaped profile for attaching two adjacent solar modules 4 onto the two top surfaces of the "U" shaped end. The "U" shaped purlin 30 form permits thermal expansion and contraction freedom to each individual solar module 4 (FIGS. 1-4). That is, the "U" shape allows for thermal cycling deltas between the torque tube 2 and the solar modules 4. Another feature is that the purlin 30 increases in height, and hence strength, from the outside edge inwards towards, and up to, the torque tube 2. The taller "U" shaped profile in proximity to the torque tube 2 has a curved or semi-circular like portion (or indent) that matches (or is congruous) up to the form of the side of a torque tube 2. In the case of a round torque tube, the purlin 30 terminates in the curved or semi-circular shape of the same radius of curvature as the torque tube 2 and has additional material from each of the two walls of the tall "U" shaped purlin 30 that are folded over to create an overlapping, double thickness back wall that fits tightly against the surface of the round torque tube 2. The walls offer much surface area to be cinched down with a retaining clamp, strap, band, etc. This removes the need for mounting tabs on the torque tube 2, and also bypasses the common practice of placing a conventional purlin on top of a torque tube. Having the purlin 30 pressed and held to the side of the torque tube 2 provides the solar modules 4 to be mounted with a lower center of gravity, presenting a non-top heavy and balanced load. In some embodiments the sloping height of the purlin 30 may be applied to the top side (similar to the purlin 1, FIGS. 1-2) so that the solar modules 4 slope downward, away from the torque tube 2, further lowering the center of gravity, balancing the system, and introducing wind mitigation effects.

In some embodiments, the purlin 30 semi-circular end that conforms to a round torque tube may be modified and formed to have a shape that is congruent to a polygonal shaped torque tube such that two of these modified purlins may be attached/connected to the sides of the polygonal shaped torque tube and fastened similarly as purlin 30.

In some embodiments, instead of one long purlin component sitting on top of a torque tube component, one or more embodiments are made of two purlins 30 (i.e., two identical "half" purlin components that have a concave semi-circular mating surface that is pulled and cinched tightly against the round torque tube 2 with a tightening strap 3).

Figure 6A:
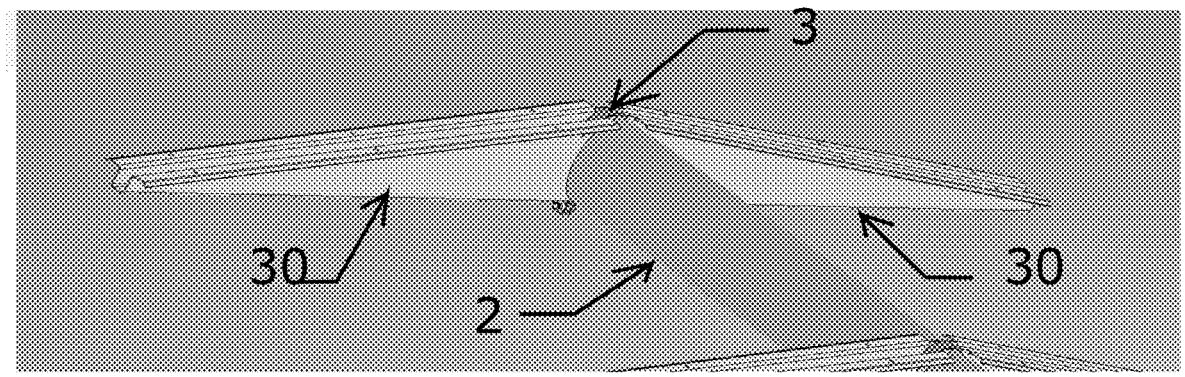
FIG. 6A shows two purlins attached to a torque tube with a cinching strap, according to one or more embodiments.
Figure 6B:
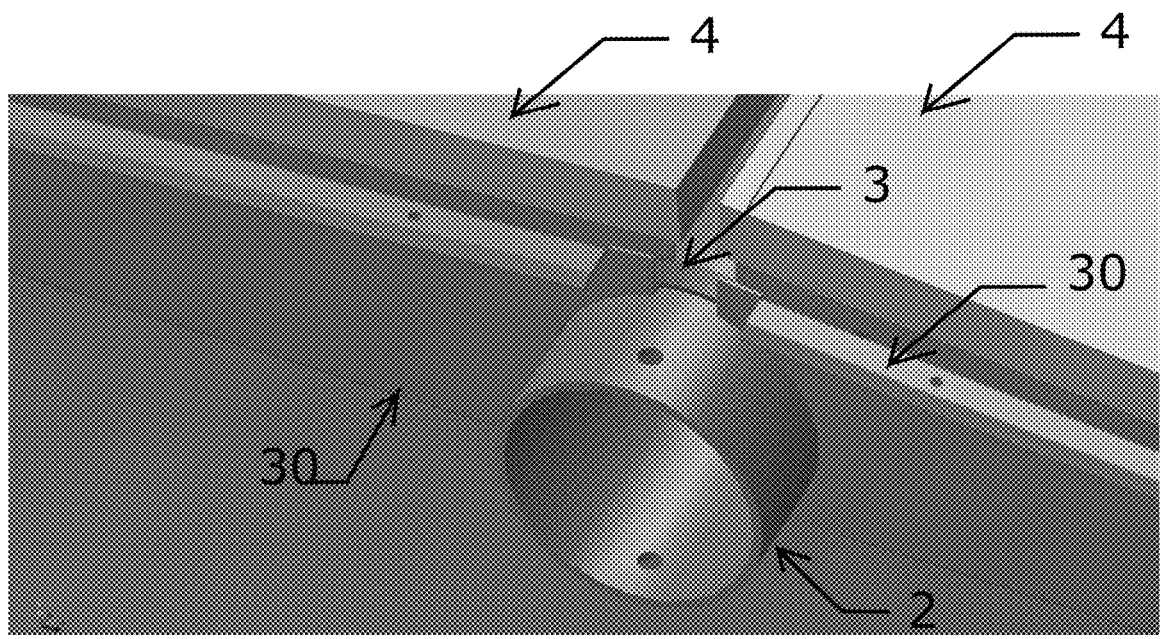
FIG. 6B shows the two purlins of FIG. 6A with the addition of the solar modules attached to the purlins, according to one or more embodiments.

FIG. 6A shows two purlins 30 attached to a torque tube 2 with a cinching strap 3, according to one or more embodiments. FIG. 6B shows the two purlins 30 of FIG. 6A with the addition of the solar modules 4 attached to the purlins 30, according to one or more embodiments. In some embodiments, the purlins 30 or 1 (e.g., FIGS. 1-2) form a contact wall, round in shape with the same or close to the same radius of curvature as the round torque tube 2. The round-on-round area surface offers much friction under the cinching force of a clamping strap 3. In some embodiments, the purlins 30 (or 1) may have a slope that maximizes the material-to-strength ratio. The slope may be formed on the top surface of the purlin 30, allowing the solar modules 4 to angle downward by a small amount, further lowering the center of gravity, and even achieving a balanced center of gravity. Some embodiments require only one retaining bolt to tighten down the one cinching strap 3. In other embodiments, the purlins 30 may be retained in place with a simple wire, preformed to make a hanger that holds two opposing purlins 30 in place while a worker inserts and tightens the retaining band.

Some embodiments provide multiple functions such as: attaching the purlin 30 directly to the side of a round torque tube 2 with no additional interface transition component; lowering the center of gravity of the solar modules 4 by attaching the purlins 30 to the two sides of, as opposed to on top of, the toque tube 2; lowering the center of gravity of the solar modules 4 by sloping the solar modules 4 slightly downward from the torque tube 2 outward by having the top side of the purlin 30 slope downward; lowering the center of gravity of the solar module 4 load by turning the purlins 30 downward; and increasing the efficient use of material by maximizing the strength-to-weight ratio of the purlin 30. One or more embodiments provide an efficient use of material by providing the purlin to be taller near the torque tube and increasingly shorter toward the outside edge, in line with the changing ever decreasing bending force.

Figure 7A:
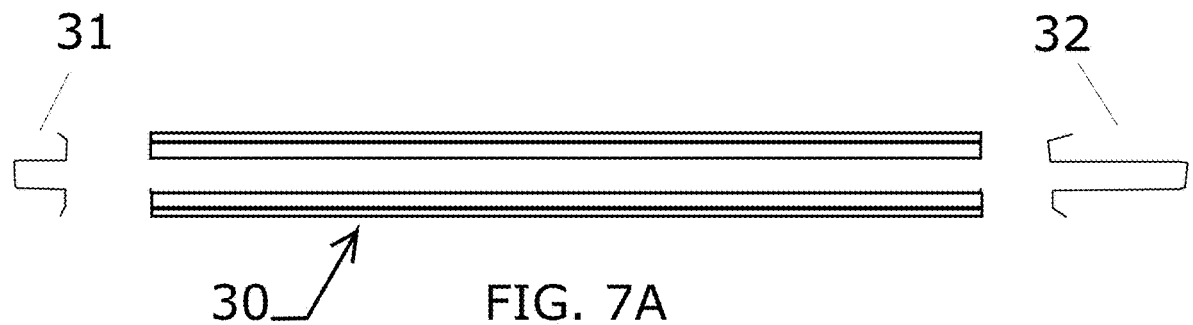
FIG. 7A shows a top view of the purlin of FIG. 3, and also showing the two side extending lips at the top of the u-form to which solar modules are attached, according to one or more embodiments.
Figure 7B:
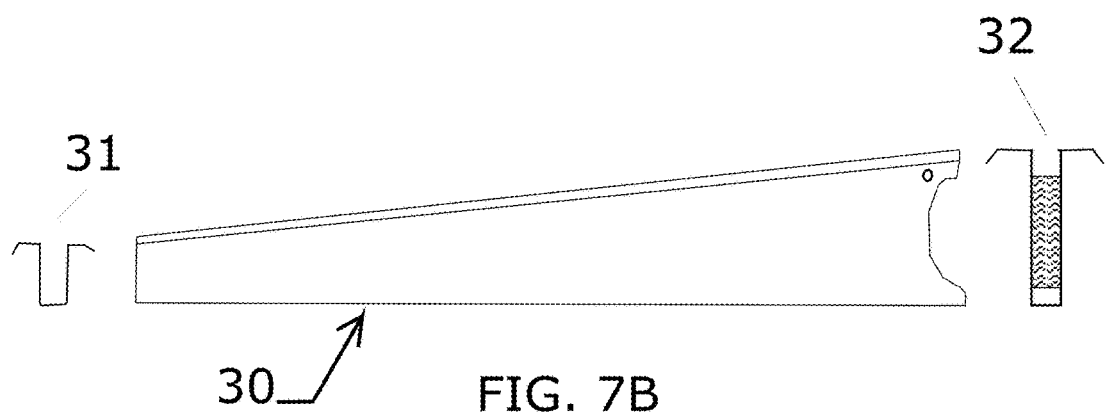
FIG. 7B shows a side view of the purlin shown in FIG. 7A, according to one or more embodiments.
Figure 7C:
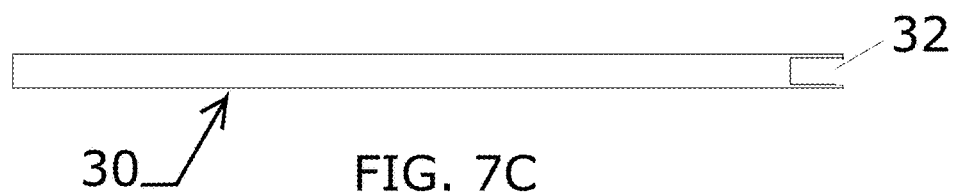
FIG. 7C shows a bottom view of the purlin shown in FIG. 7A, according to one or more embodiments.

FIG. 7A shows a top view of the purlin 30 of FIG. 3, and also showing the two side extending lips at the top of the u-shaped form (or u-form) to which solar modules 4 (FIGS. 1-4 and 6B) are attached, according to one or more embodiments. The lower height end 31 and upper height end 32 of the purlin 30 are shown. FIG. 7B shows a side view of the purlin 30 shown in FIG. 7A, according to one or more embodiments. The lower height end 31 and upper height end 32 of the purlin 30 are shown. FIG. 7C shows a bottom view of the purlin 30 shown in FIG. 7A, according to one or more embodiments. As shown, the long bottom of the long U-shaped trough of the purlin 30 is shown, along with the upper height end 32.

Figure 8:
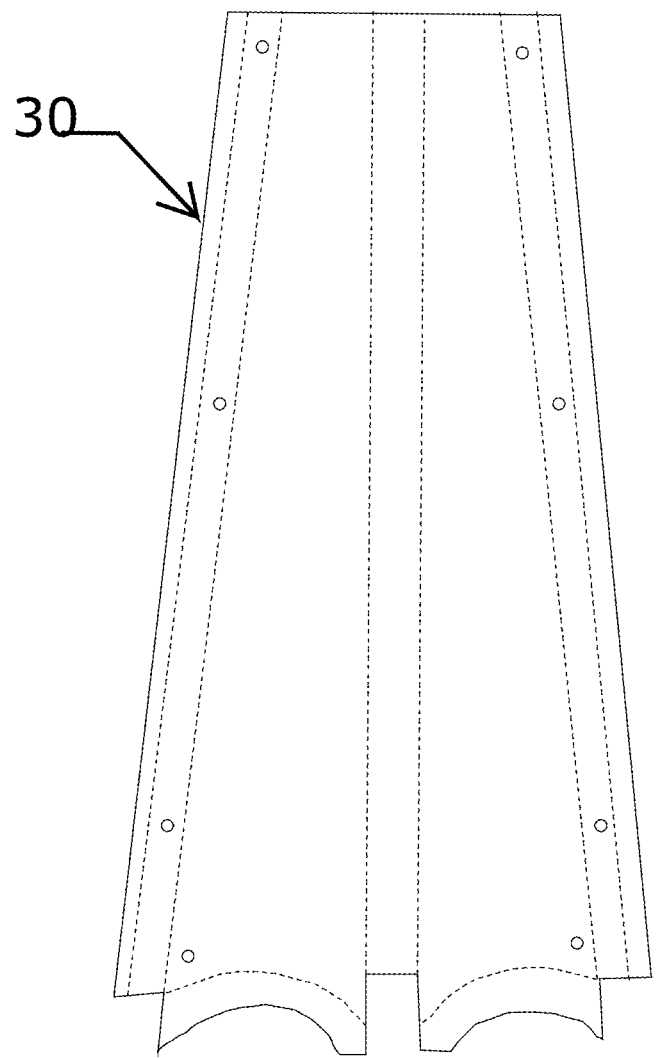
FIG. 8 shows purlin patterns on flat sheet metal, before forming, according to one or more embodiments.

FIG. 8 shows purlin 30 patterns on flat sheet metal, before forming, according to one or more embodiments. As shown, the cut and fold patterns are made to form flat sheet metal into the formed purlin component 30. Similar opposite patterns may be used for forming purlin 1 (FIGS. 1-2). In some embodiments, the patterns shown may be formed by conventional cutting, punching, etching, bending, molding and forming techniques.

Figure 9:
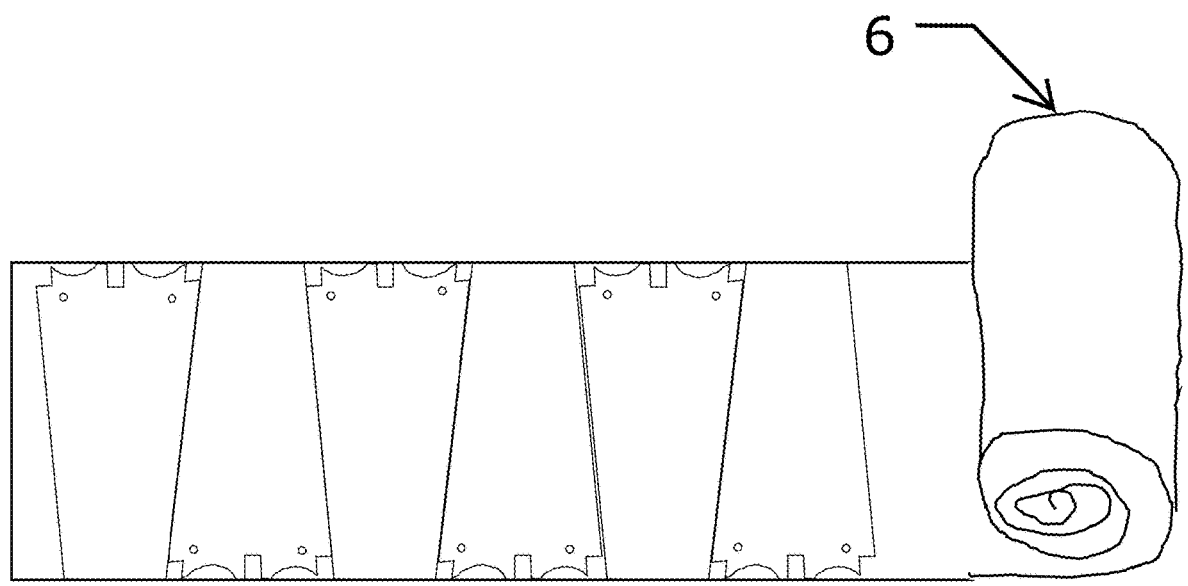
FIG. 9 shows purlin patterns on an unfurling flat sheet metal, before forming, according to one or more embodiments.

FIG. 9 shows purlin 30 patterns on an unfurling flat sheet metal 6, before forming, according to one or more embodiments. As shown, the cut and punch patterns to create from a roll of sheet metal 6, many pre-cut, ready-to-form individual sheets of metal as shown in FIG. 8. Low prices for renewable energy mandate that cost savings be achieved in the material cost, the installation cost, and the operation and maintenance (O&M) cost. Installation costs are reduced by having a purlin system (using purlin 1, e.g., FIGS. 1-2, or purlin 30) that is easy to attach, allows for minute adjustments for aesthetics, and creates a lower center of gravity that is safer during installation. The purlin 30 is formed in a quick process, and may be nested with one another for enhanced shipping or transporting efficiency.

Figure 10A:
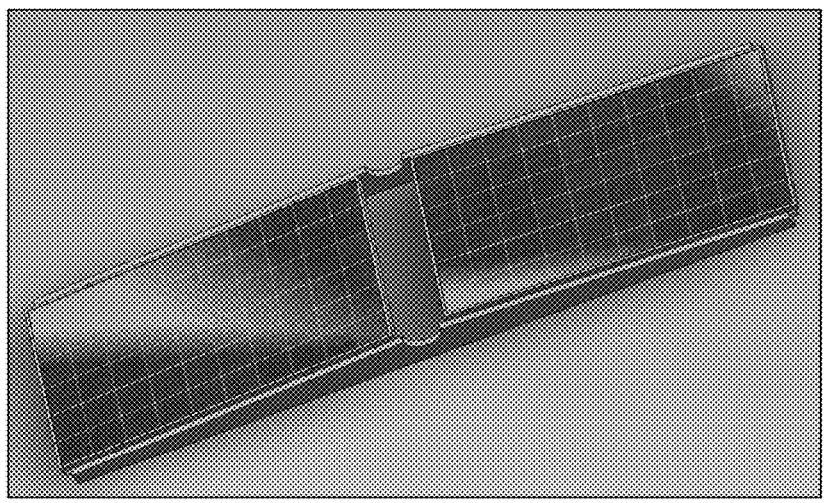
FIG. 10A shows a test example of using planks of wood with a sloped top surface for solar module mounting as test purlins for a field test, according to one or more embodiments.
Figure 10B:
FIG. 10B shows the example of FIG. 10A in a field test with two slightly downward sloping solar modules mounted on a pair of test purlins achieving a lower center of gravity, according to one or more embodiments.

FIG. 10A shows a test example (or model) 1000 of using planks of wood with a sloped top surface for solar module mounting as test purlins (modeling purlin 30, e.g., FIGS. 3-4) for a field test, according to one or more embodiments. FIG. 10B shows the example 1000 of FIG. 10A in a field test with two slightly downward sloping solar modules mounted on a pair of test purlins achieving a lower center of gravity, according to one or more embodiments.

Figure 11A:
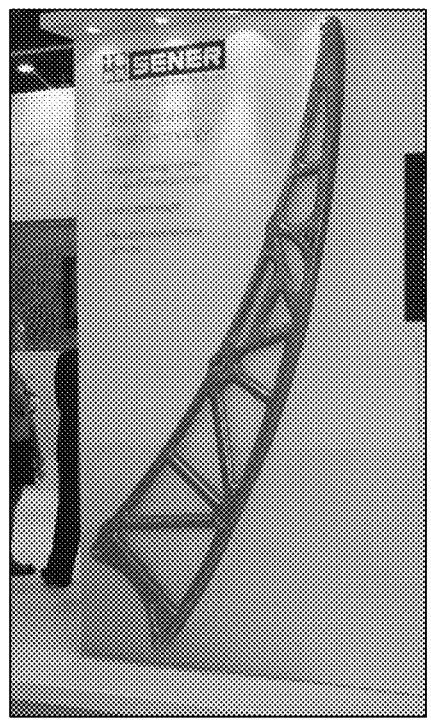
FIG. 11A shows a conventional purlin that mounts to the side of a torque tube that must have factory attached tabs.
Figure 11B:
FIG. 11B shows use of several purlins of FIG. 11A and attaching tabs to round torque tubes where large parabolic mirrors are attached to the torque tube.

FIG. 11A shows a conventional purlin 1100 that mounts to the side of a torque tube that must have factory attached tabs. FIG. 11A shows an example 1100 of purlin components 1100 that mount to the side of a torque tube and that must have factory attached tabs. Attaching tabs to round torque tubes adds cost in material, production, transportation. This is required for very large and unbalanced loads. FIG. 11B shows an example 1110 use of several purlins 1100 of FIG. 11A and attaching structures or tabs to round torque tubes where large parabolic mirrors are attached to the torque tube.

Figure 12A:
FIGS. 12A-D show conventional purlins and the difficulty of attaching the flat surface of a purlin to a round torque tube.
Figure 12B:
Figure 12C:
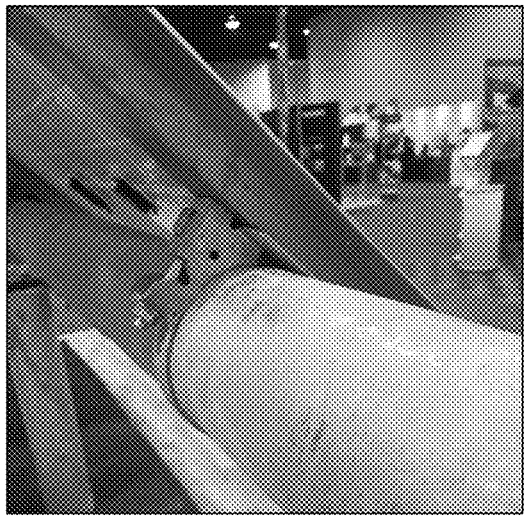
Figure 12D:
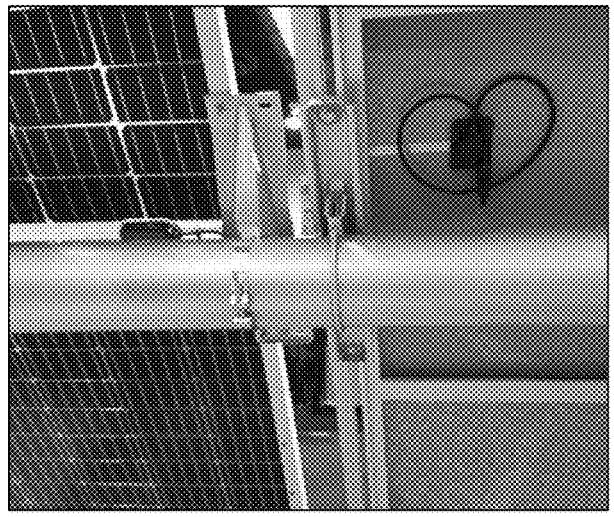

FIGS. 12A-D show conventional purlins and the difficulty of attaching the flat surface of a purlin to a round torque tube. The example 1200 of FIG. 12A and the example 1210 of FIG. 12B show conventional purlins sitting on top of square torque tubes, and are unable to achieve a lower center of balance and each having to rely on a flat surface of the square torque tube to keep from slipping when under strong wind forces. The example 1220 of FIG. 12C and the example 1230 of FIG. 12D show purlins sitting on top of round torque tubes, and being held tightly to those torque tubes with cinching straps, but that each include an additional component as a mechanical transition from the flat purlin to round torque tube.

Figure 13A:
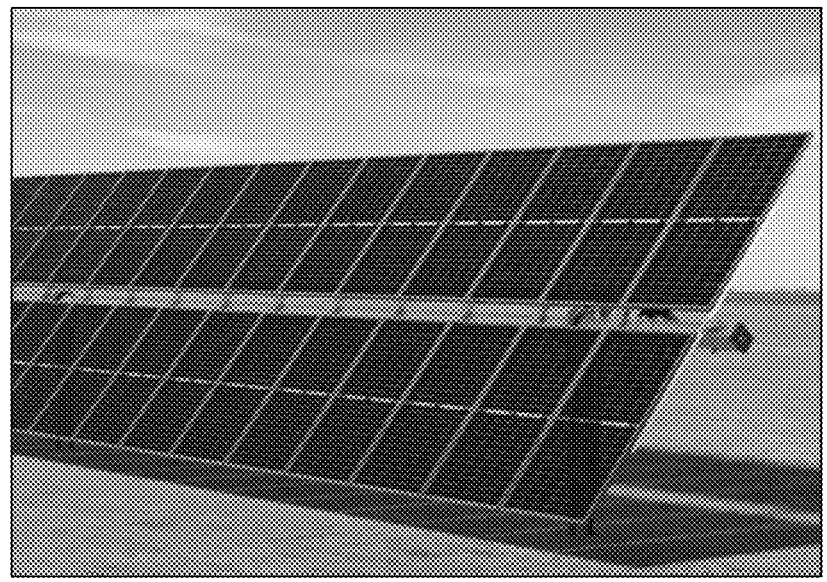
FIG. 13A shows conventional purlins sitting on top of a square torque tube.
Figure 13B:
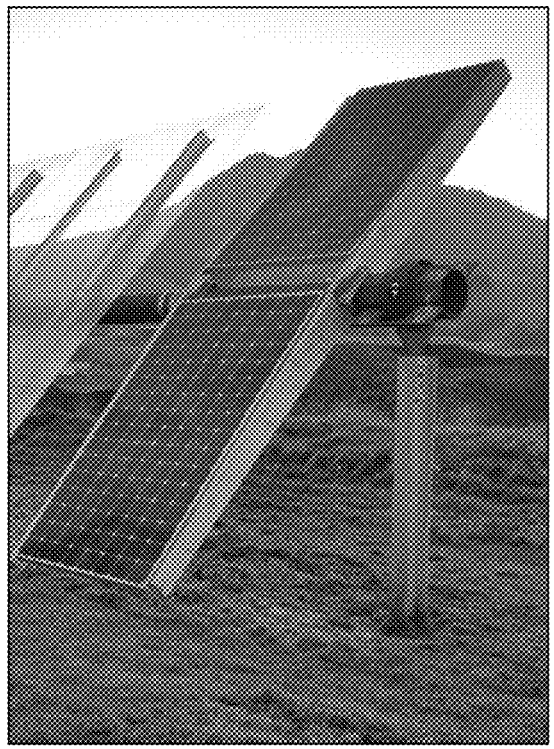
FIG. 13B shows sloped test purlins, simulating the attachment of the test purlins to the sides of a torque tube and achieving a lower center of gravity of solar modules, according to one or more embodiments.

FIG. 13A shows an example 1300 of conventional purlins sitting on top of a square torque tube. FIG. 13B shows an example 1310 of sloped test purlins (similar to purlins 30, e.g., FIGS. 3-4), simulating the attachment of purlins to the sides of a torque tube and achieving a lower center of gravity of solar modules, according to one or more embodiments. The independent test purlins on each side of the round torque tube allows minute adjustments in slope, easy alignment and non-waviness of the many solar modules and which achieves a lower, and even a balanced, center of gravity of the load of the solar modules.

Figure 14A:
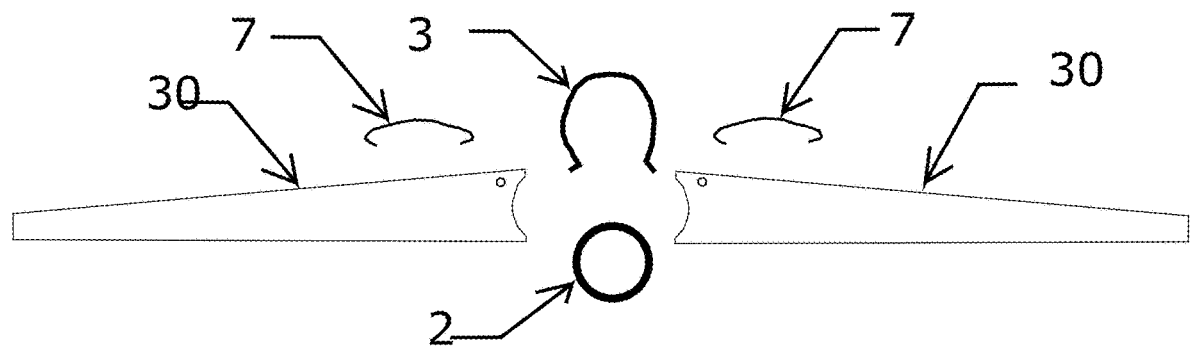
FIG. 14A shows the beginning of the process of attaching purlins to the sides of a torque tube using alignment-hangers and a tightening strap, according to one or more embodiments.
Figure 14B:
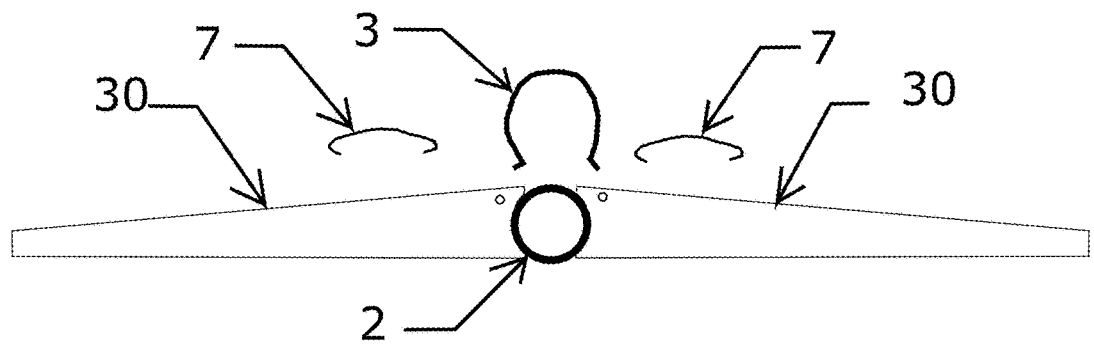
FIG. 14B shows two purlins temporarily in place against the two opposite sides of a torque tube, according to one or more embodiments.
Figure 14C:
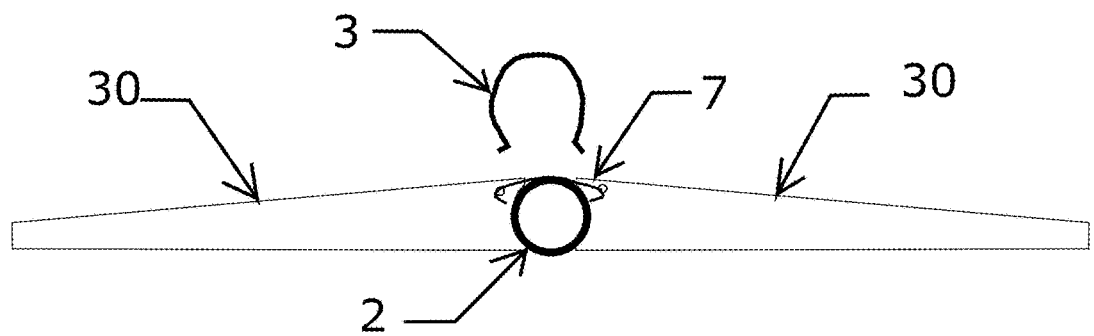
FIG. 14C shows the two purlins held in place by the addition of two holding hooks, according to one or more embodiments.

FIG. 14A shows the beginning of a process of attaching purlins 30 to the sides of a torque tube 2 using alignment hangers 7 (or holding hooks) and a tightening strap 3, according to one or more embodiments. FIG. 14B shows two purlins 30 temporarily in place against the two opposite sides of a torque tube 2, according to one or more embodiments. FIG. 14C shows the two purlins 30 held in place by the addition of two alignment hangers 7, according to one or more embodiments. The alignment hangers 7 may be heavy gauge, one strand, galvanized wire, bent to hold the two purlins 30 in place, allowing a worker to use both hands to attach the (cinching) tightening strap 3.

Figure 15A:
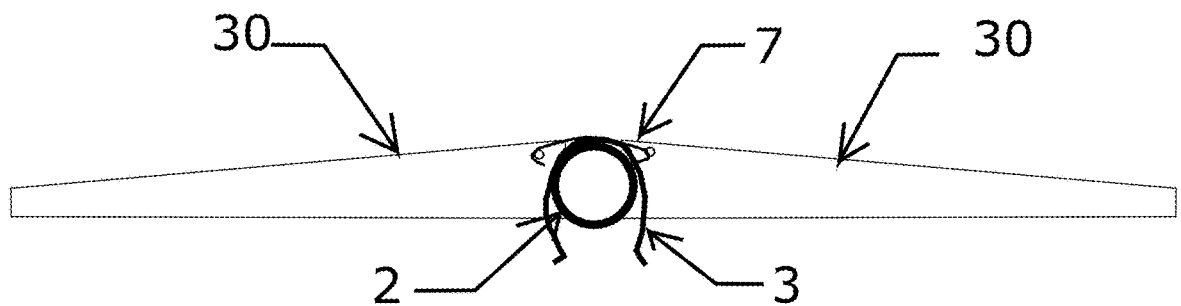
FIG. 15A shows purlins held in position on a torque tube via alignment-hangers, while the tightening strap is inserted through the purlins and around the torque tube, according to one or more embodiments.
Figure 15B:
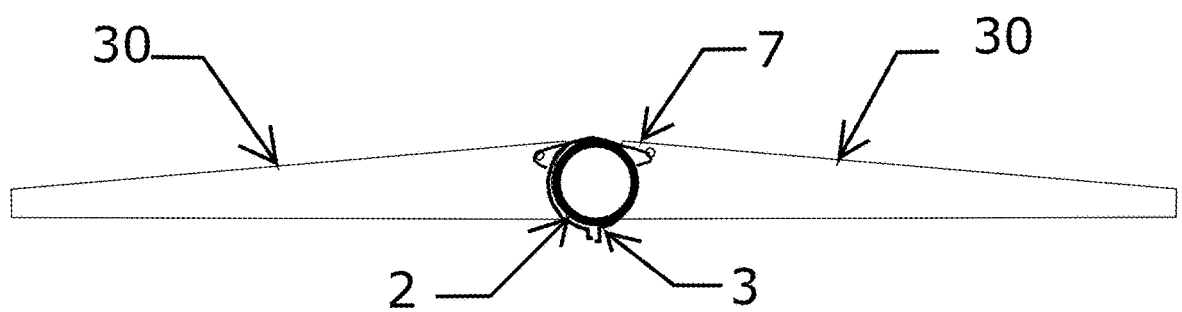
FIG. 15B shows the tightening strap in place to be tightened with nut and bolt hardware, according to one or more embodiments.
Figure 15C:
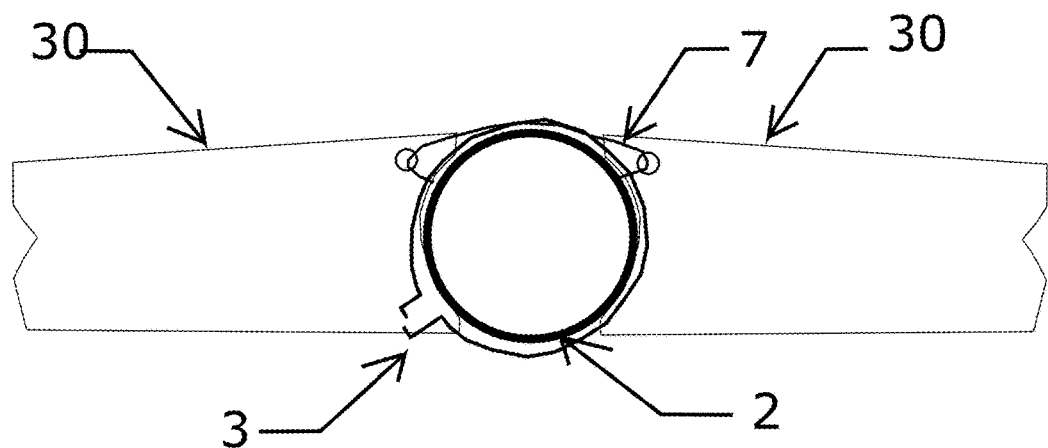
FIG. 15C shows a closeup view of the tightening strap, turned slightly so that the protruding tabs of the tightening strap are hidden up inside one of the two purlins for safety reasons, according to one or more embodiments.

FIG. 15A shows purlins 30 held in position on a torque tube 2 via alignment-hangers 7, while the tightening strap 3 is inserted through the purlins 30 and around the torque tube 2, according to one or more embodiments. FIG. 15B shows the tightening strap 3 in place to be tightened with nut and bolt hardware, according to one or more embodiments. FIG. 15C shows a closeup view of the tightening strap 3, turned slightly so that the protruding tabs of the tightening strap 3 are hidden up inside one of the two purlins 30 for safety reasons, according to one or more embodiments.

Figure 16A:
FIG. 16A shows two rows of single-axis trackers with sloped purlins resulting in sloped solar modules while the row is at zero tilt, according to one or more embodiments.
Figure 16B:
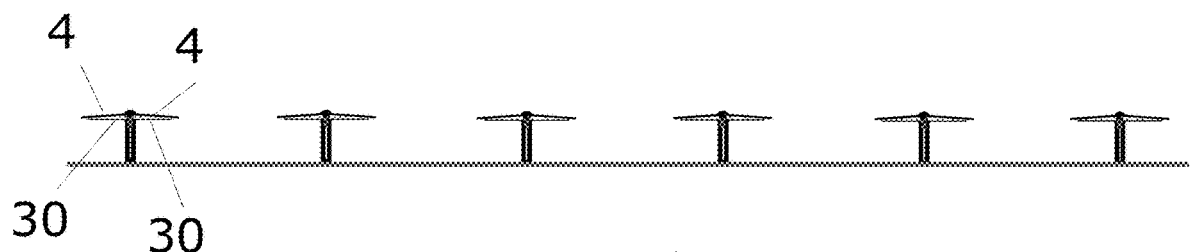
FIG. 16B shows six rows of single-axis trackers with sloped purlins resulting in sloped solar modules while the row is at zero tilt, according to one or more embodiments.

FIG. 16A shows an example 1600 of two rows of single-axis trackers with sloped purlins 30 resulting in sloped solar modules 4 while the row is at zero tilt, according to one or more embodiments. FIG. 16B shows six rows of single-axis trackers with sloped purlins 30 resulting in sloped solar modules 4 while the row is at zero tilt, according to one or more embodiments.

Figure 17A:
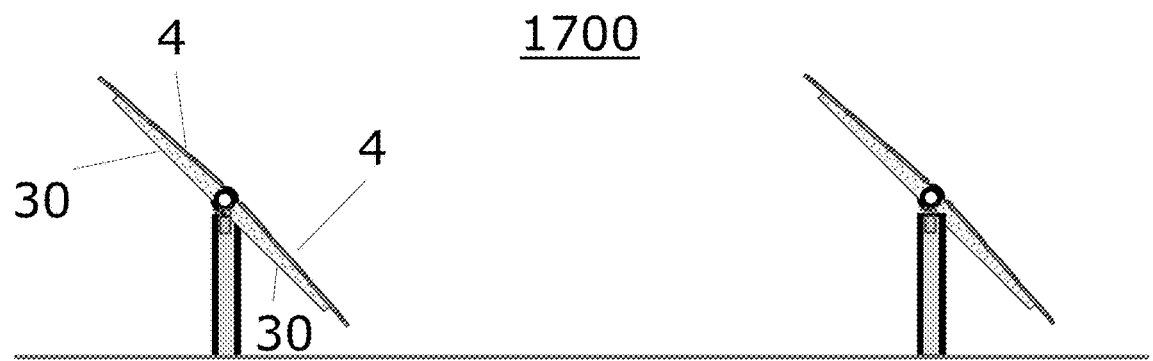
FIG. 17A shows an example of two rows of single-axis trackers with sloped purlins resulting in sloped solar modules while the row is at a 45-degree tilt, according to one or more embodiments.
Figure 17B:
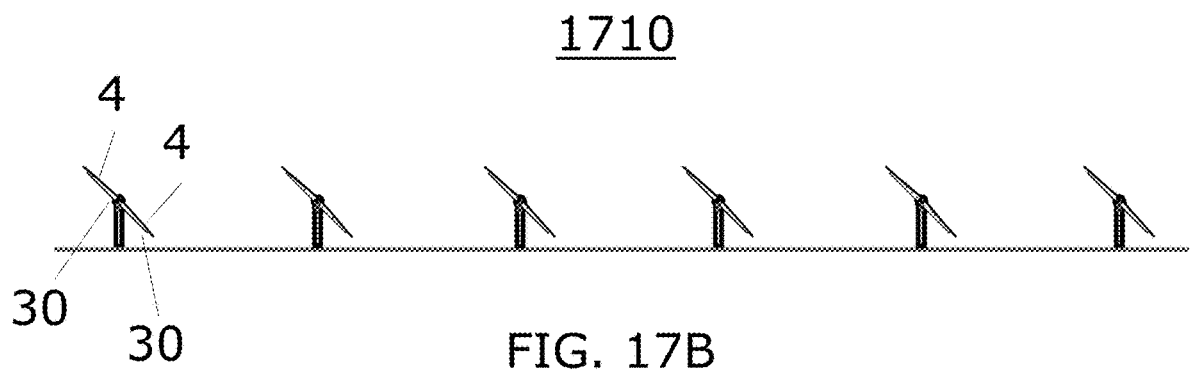
FIG. 17B shows an example of six rows of single-axis trackers with sloped purlins resulting in sloped solar modules while the row is at a 45-degree tilt, according to one or more embodiments.

FIG. 17A shows an example 1700 of two rows of single-axis trackers with sloped purlins 30 resulting in sloped solar modules 4 while the row is at a 45-degree tilt, according to one or more embodiments. FIG. 17B shows an example 1710 of six rows of single-axis trackers with sloped purlins 30 resulting in sloped solar modules 4 while the row is at a 45-degree tilt, according to one or more embodiments.

Figure 18A:
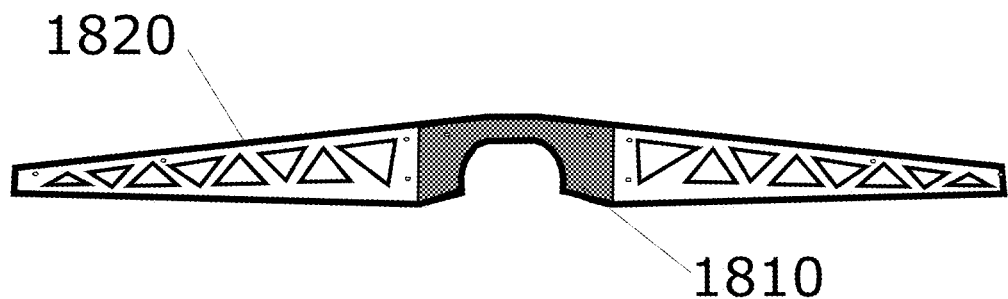
FIG. 18A shows two connected purlins showing an adapter that may be used for different shaped torque tubes, according to one or more embodiments.

FIG. 18A shows two connected purlins 1820 showing an adapter (plate) 1810 that may be used for different shaped torque tubes, according to one or more embodiments. In some embodiments, the adapter 1810 includes a planar (or linear) shaped upper portion and rounded shaped side portions, which may accommodate a round torque tube or polygonal shaped torque tube. In another embodiment, the adapter 1810 may be switched out for another adapter that may be shaped with planar (or linear) side portions to adapt to a square, rectangular or polygonal shaped torque tube.

Figure 18B:
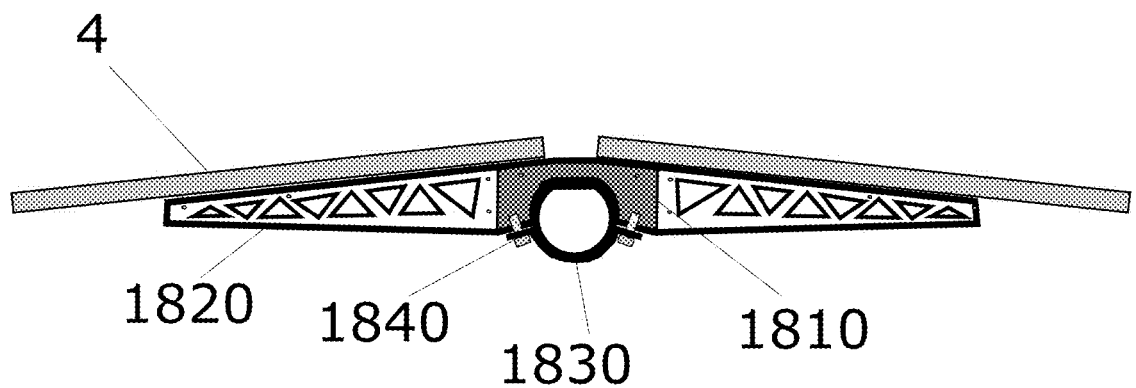
FIG. 18B shows two connected purlins showing an adapter that may be used for different shaped torque tubes, according to one or more embodiments.

FIG. 18B shows two connected purlins 1820 showing an adapter 1810 that may be used for different shaped torque tubes and where solar modules 4 are attached to the purlins 1820, according to one or more embodiments. In some embodiments, a clamp 1830 (e.g., a fastening strap or clamp, coupler, etc.) may be attached to a lower portion of the adapter 1810 using fasteners 1840 (e.g., bolts, locking pins, etc.).

This invention has been described in its presently contemplated best embodiment, and it is clear that it is susceptible to numerous modifications, modes and embodiments within the ability of those skilled in the art and without the exercise of the inventive faculty. Accordingly, the scope of this invention is defined by the scope of the following claims.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises"

and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. An apparatus for solar tracker systems, comprising:
a first purlin including a first mating surface configured for frictional attachment to a first side of a torque tube, the first purlin further including a first linear shaped top surface configured for mounting a first solar module; and
a second purlin including a second mating surface configured for frictional attachment to a second side of the torque tube, the second purlin further including a second linear shaped top surface configured for mounting a second solar module;
wherein the first purlin and the second purlin couple to one another with at least one alignment device and a fastening clamp that is configured for holding the first purlin and the second purlin against the torque tube;
wherein the first purlin and the second purlin are each U-shaped, and the fastening clamp is a circular shaped fastening clamp;
wherein each of the first purlin and the second purlin has a height that tapers between a first end and a second end, and the fastening clamp is configured for insertion through the first purlin and the second purlin, and fastened around the torque tube;
wherein the first purlin and the second purlin are stamped from sheet metal, and the fastening clamp includes a first tab and a second tab.

2. The apparatus of claim 1, wherein the torque tube has one of a cylindrical shape and a polygonal shape, the fastening clamp is configured to be positioned such that the first tab and the second tab are hidden inside one of the first purlin or the second purlin.

3. The apparatus of claim 2, wherein the cylindrical shape has a same radius of curvature as each of the first mating surface and the second mating surface.

4. The apparatus of claim 1, wherein the first purlin and the second purlin each have a double-layer wall that are configured to connect against the torque tube and form a frictional attachment.

5. The apparatus of claim 1, wherein:
the first purlin further comprises access openings at the first top surface and a first bottom surface that are configured for insertion of the fastening clamp into a first cavity of the first purlin and against an inside surface of the double-layer wall; and
the second purlin further comprises access openings at the second top surface and a second bottom surface that are configured for insertion of the fastening clamp into a second cavity of the second purlin and against an inside surface of the double-layer wall.

6. The apparatus of claim 1, wherein the first purlin and the second purlin are made from one of galvanized steel, aluminum, sheet metal or a hardened polymer.

7. An apparatus for solar tracker systems, comprising:
a first U-shaped purlin including a first mating surface for frictional attachment to a torque tube having a first congruent shape for coupling with the first mating surface, the first U-shaped purlin further including a first top surface configured for mounting a first solar module; and
a second U-shaped purlin including a second mating surface for frictional attachment to the torque tube having a second congruent shape for coupling with the second mating surface, the second U-shaped purlin further including a second top surface configured for mounting a second solar module;
wherein the first U-shaped purlin and the second U-shaped purlin couple to one another with at least one alignment device and a fastening clamp that is configured for holding the first U-shaped purlin and the second U-shaped purlin against the torque tube;
wherein each of the first U-shaped purlin and the second U-shaped purlin has a height that tapers between a first end and a second end, and the fastening clamp is configured for insertion through the first purlin and the second purlin, and fastens around the torque tube;
wherein the first mating surface and the second mating surface have a semi-circular concave mating surface, the torque tube has a cylindrical shape, and the fastening clamp includes a first tab and a second tab.

8. The apparatus of claim 7, wherein the first U-shaped purlin and the second U-shaped purlin are stamped from sheet metal, and the fastening clamp is a circular shaped fastening clamp.

9. The apparatus of claim 7, wherein the first U-shaped purlin and the second U-shaped purlin are stamped from sheet metal, and the fastening clamp is configured to be positioned such that the first tab and the second tab are hidden inside one of the first purlin or the second purlin.

10. The apparatus of claim 9, wherein the cylindrical shape has a same radius of curvature as each of the first mating surface and the second mating surface.

11. The apparatus of claim 7, wherein the first U-shaped purlin and the second U-shaped purlin each have a double-layer wall that are configured to connect against the torque tube and form a frictional attachment.

12. The apparatus of claim 7, wherein:
the first U-shaped purlin further comprises access openings at the first top surface and a first bottom surface that are configured for insertion of the fastening clamp into a first cavity of the first U-shaped purlin and against an inside surface of the double-layer wall: and
the second U-shaped purlin further comprises access openings at the second top surface and a second bottom surface that are configured for insertion of the fastening clamp into a second cavity of the second U-shaped purlin and against an inside surface of the double-layer wall.

13. The apparatus of claim 7, wherein the first U-shaped purlin and the second U-shaped purlin are made from one of galvanized steel, aluminum, sheet metal or a hardened polymer.

* * * * *